(12) United States Patent
Kim et al.

(10) Patent No.: US 9,611,912 B2
(45) Date of Patent: Apr. 4, 2017

(54) BODY VALVE ASSEMBLY FOR SHOCK ABSORBER

(71) Applicant: MANDO CORPORATION, Pyeongtaek-si, Gyeonggi-do (KR)

(72) Inventors: Hark Joo Kim, Seoul (KR); Nam Ho Kim, Yongin-si (KR); Jun Hyuk Lim, Seongnam-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 14/801,795

(22) Filed: Jul. 16, 2015

(65) Prior Publication Data

US 2016/0017952 A1    Jan. 21, 2016

(30) Foreign Application Priority Data

Jul. 16, 2014    (KR) ........................ 10-2014-0090086

(51) Int. Cl.
*F16F 9/348*    (2006.01)
*F16F 9/512*    (2006.01)
*F16F 9/34*    (2006.01)

(52) U.S. Cl.
CPC ............ *F16F 9/3482* (2013.01); *F16F 9/512* (2013.01); *F16F 9/3415* (2013.01)

(58) Field of Classification Search
CPC ........ F16F 9/34; F16F 9/18; F16F 9/44; F16F 9/185; F16F 9/325; F16F 9/369; F16F 9/3482; F16F 9/062; F16F 9/26
See application file for complete search history.

(56) References Cited

U.S. PATENT DOCUMENTS

| | | | | |
|---|---|---|---|---|
| 4,561,524 A * | 12/1985 | Mizumukai | ............ | B60G 17/08 188/282.4 |
| 4,768,629 A * | 9/1988 | Wossner | .................. | F16F 9/49 188/271 |
| 4,971,180 A * | 11/1990 | Kobayashi | ................ | F16F 9/46 188/282.4 |
| 5,148,897 A * | 9/1992 | Vanroye | ................ | F16F 9/3482 188/282.6 |
| 8,066,105 B2 * | 11/2011 | Maniowski | ........... | F16F 9/3487 188/282.1 |
| 2008/0185245 A1* | 8/2008 | Park | ........................ | F16F 9/465 188/322.15 |
| 2008/0185246 A1* | 8/2008 | Park | ........................ | F16F 9/465 188/322.15 |
| 2008/0190719 A1* | 8/2008 | Jee | ........................ | F16F 9/3207 188/322.13 |
| 2010/0326780 A1* | 12/2010 | Murakami | .............. | F16F 9/446 188/322.13 |
| 2011/0290603 A1* | 12/2011 | Yabe | ....................... | F16F 9/348 188/282.1 |

(Continued)

FOREIGN PATENT DOCUMENTS

JP        2013-242031 A       12/2013

*Primary Examiner* — Robert A Siconolfi
*Assistant Examiner* — James Hsiao
(74) *Attorney, Agent, or Firm* — McDermott Will & Emery LLP (57) ABSTRACT

The present invention relates to a body valve assembly for a shock absorber, which is capable of improving ride comfort by improving the degree of freedom of the adjustment in damping force and preventing the damping force from being rapidly changed.

8 Claims, 4 Drawing Sheets

(56) References Cited

U.S. PATENT DOCUMENTS

| | | | |
|---|---|---|---|
| 2012/0305348 A1* | 12/2012 | Katayama | B60G 17/08 188/266.2 |
| 2013/0074341 A1* | 3/2013 | Kitagawa | B29C 45/1459 29/890.12 |
| 2013/0081912 A1* | 4/2013 | Murakami | F16F 9/06 188/282.1 |
| 2014/0252735 A1* | 9/2014 | Yamashita | F16F 9/342 280/6.157 |

* cited by examiner

BODY VALVE ASSEMBLY FOR SHOCK ABSORBER

CROSS-REFERENCE(S) TO RELATED APPLICATION

This application claims priority of Korean Patent Application No. 10-2014-0090086, filed on Jul. 16, 2014, in the Korean Intellectual Property Office, which is hereby incorporated by reference in its entirety.

BACKGROUND OF THE INVENTION

Field of the Invention

The present invention relates to a body valve assembly for a shock absorber, and more particularly, to a body valve assembly for a shock absorber, which is capable of improving ride comfort by improving the degree of freedom of the adjustment in damping force and preventing the damping force from being rapidly changed.

Description of the Related Art

In general, a shock absorber is designed to support a weight of a vehicle body and suppress and dampen a vibration transferred from a road surface to the vehicle body, contributing to improving ride comfort and protecting loaded goods and various parts of a vehicle.

Since a vehicle continuously receives a vibration or a shock transferred from a road surface through vehicle wheels during driving, a shock absorber is installed between a vehicle body (or a frame) and an axle to prevent the vibration or the shock from being directly transferred to the vehicle body, thereby improving ride comfort. A suction valve of an existing shock absorber includes a piston rod inserted from the outside to slidably reciprocate within an inner tube filled with a fluid, and a body valve fixedly installed under the inner tube so as to face a piston valve connected to a lower end of the piston rod.

In such an existing body valve, a single passage is formed by a working fluid flowing during rebound and compression strokes, and damping forces of all sections from a low-speed section to a high-speed section are determined by a spring constant of a leaf spring disk on an upper side of the body valve.

Therefore, when a damping force of the low-speed section is set to be high, a damping force of the high-speed section excessively increases.

In addition, when a rigidity of a piston compression side in the existing body valve is set to be high, a cavitation occurs to generate a distortion in a damping force graph. It is difficult to smoothly control the damping force.

As the prior document related to the present invention, Korean Patent Application Number 10-2001-0064273 (2001 Oct. 18) discloses a base valve for a vehicle shock absorber.

SUMMARY OF THE INVENTION

The present invention has been made in an effort to solve the above problems and is directed to provide a body valve assembly for a shock absorber, which is capable of improving ride comfort by improving the degree of freedom of the adjustment in damping force adjustment and preventing the damping force from being rapidly changed.

According to an embodiment of the present invention, a body valve assembly for a shock absorber includes: a cylinder divided into an inner cylinder and an outer cylinder such that a reservoir chamber is formed therebetween; a valve body which is installed in a lower end of the inner cylinder and includes at least one compression passage allowing a working fluid to flow from the inner cylinder to the reservoir chamber during a compression stroke and at least one rebound passage allowing the working fluid to flow from the reservoir chamber to the inner cylinder during a rebound stroke; a body retainer which is disposed under the valve body and spaced apart from the valve body and includes at least one compression communication passage so as to be connected to the compression passage; a pilot chamber which is formed to have a recessed space on a top surface of the body retainer and communicates with a lower end of the compression passage and an upper end of the compression communication passage; a pilot valve which is disposed between the valve body and the body retainer, the pilot valve being simultaneously opened to communicate the lower end of the compression passage with the reservoir chamber when the working fluid moves to the pilot chamber during a low-speed compression stroke; and a main valve module which is closed in a state of coming into close contact with a bottom surface of the body retainer during the low-speed compression stroke, and is opened when a pressure of the pilot chamber is above a set pressure range during a high-speed compression stroke, so that the compression communication passage communicates with the reservoir chamber.

The valve body may include: a body which is installed in an inner lower end of the inner cylinder and has the compression passage formed in a central direction and the rebound passage formed in an edge direction; and a connection passage which is cut along a lower edge of the body at a set interval to communicate the lower end of the compression passage with the reservoir chamber when the pilot valve is opened, and an inner periphery of the connection passage communicates the lower end of the compression passage with the reservoir chamber by the opening of the pilot valve during a compression stroke, and communicates the reservoir chamber with a lower end of the rebound stroke during a rebound stroke.

The valve body may include: an inner cylinder mount protrusion which is stepped along an upper edge of the body so as to fix the lower end of the inner cylinder; and a lower disk sheet that is formed to have a ring shape on a bottom surface of the body and protrudes along an outer periphery of the compression passage.

The pilot valve may include: a first pilot disk which is disposed on a bottom surface of the body in a state in which a central portion of the first pilot disk comes into contact with the bottom surface of the body; a second pilot disk which is disposed on a bottom surface of the first pilot disk and has a first communication holes vertically penetrating along an edge portion; and a third pilot disk which is disposed on a bottom surface of the second pilot disk and has a larger diameter than the second pilot disk, a top surface of the third pilot disk coming into close contact with the lower end of the body, a side surface of the third pilot disk being installed to be movable while coming into close contact with an inner wall of the pilot chamber, a second communication hole being formed to vertically penetrate the third pilot disk such that the first communication hole communicates with the pilot chamber.

The body valve assembly may include a rubber which is disposed under the third pilot disk, wherein the rubber has a hollow in a center such that the second communication hole communicates with the pilot chamber, and the rubber is installed to be movable while coming into close contact with the inner wall of the pilot chamber.

The valve retainer may include: a retainer body which is disposed under the valve body; a valve support portion which protrudes from a central portion of the retainer body and supports the central portion of the pilot valve; and a body mount protrusion which is stepped along an upper edge of the retainer body so as to mount and fix the valve body, the pilot chamber is recessed in a ring shape on a top surface of the retainer body along an outer periphery of the valve support portion, and the compression communication passage penetrates a bottom surface of the pilot chamber.

An upper end of the valve support portion may protrude higher than the top surface of the retainer body.

The main valve module may include: a disk-S which is mounted on the bottom surface of the body retainer; at least one main disk which is stacked on a bottom surface of the disk-S; a main spacer which is disposed on a bottom surface of the main disk; and a main washer which is disposed on a bottom surface of the main spacer.

The valve body, the pilot valve, and the body retainer may be sequentially stacked by a pin that vertically penetrates centers thereof.

DETAILED DESCRIPTION OF EXEMPLARY EMBODIMENTS

The advantages and features of the present invention and methods for achieving them will become more apparent from the following embodiments that are described in detail in conjunction with the accompanying drawings.

However, the present invention is not limited to the following embodiments and may be embodied in various forms.

These embodiments are provided so that this disclosure will be thorough and complete, and will fully convey the scope of the invention to those skilled in the art.

The scope of the present invention is defined by the appended claims.

Therefore, in some embodiments, detailed descriptions of well-known elements, operations, and technologies will be omitted since they would unnecessarily obscure the subject matters of the present invention.

Throughout the disclosure, like reference numerals refer to like elements. The terminology used herein is for the purpose of describing particular embodiments only and is not intended to be limiting of the present invention.

In this specification, the singular forms "a", "an", and "the" are intended to include the plural forms as well, unless the context clearly indicates otherwise. It will be understood that terms such as "comprise", "include", and "have", when used herein, specify the presence of stated elements and operations, but do not preclude the presence or addition of one or more other elements and operations.

Unless otherwise defined, all terms used herein, including technical and scientific terms, have the same meaning as commonly understood by one of ordinary skill in the art to which the inventive concept belongs.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
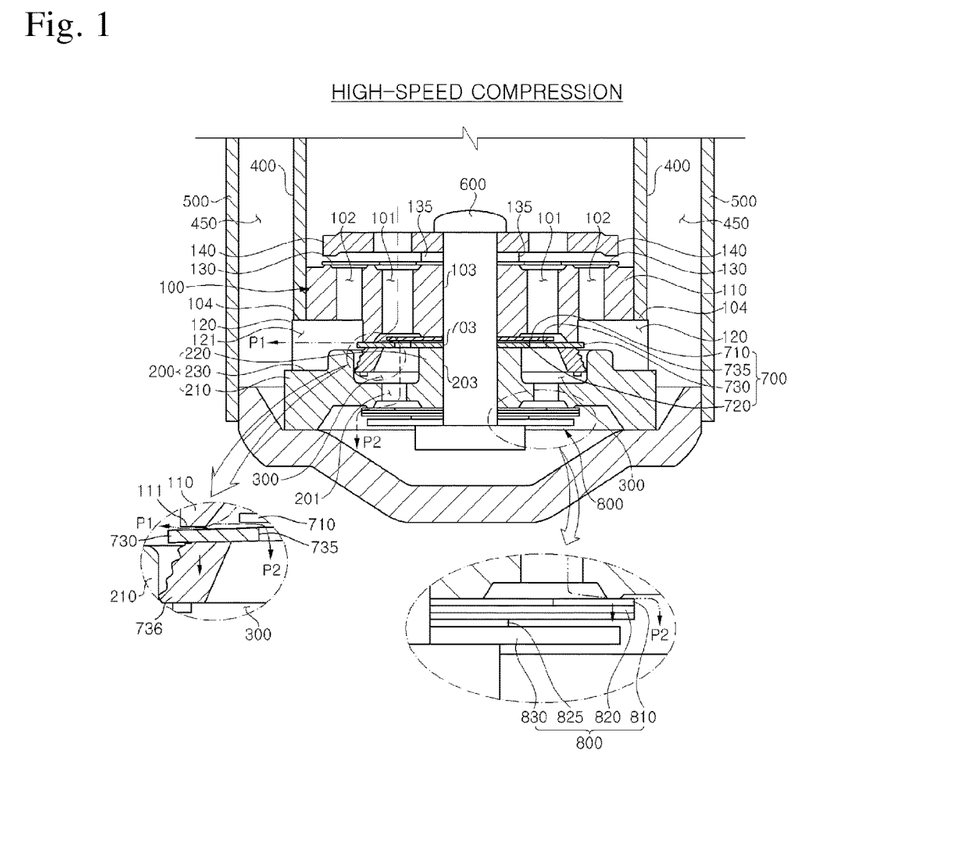
FIG. 1 is a cross-sectional view illustrating a high-speed compression stroke state of a body valve assembly for a shock absorber according to the present invention.
Figure 2:
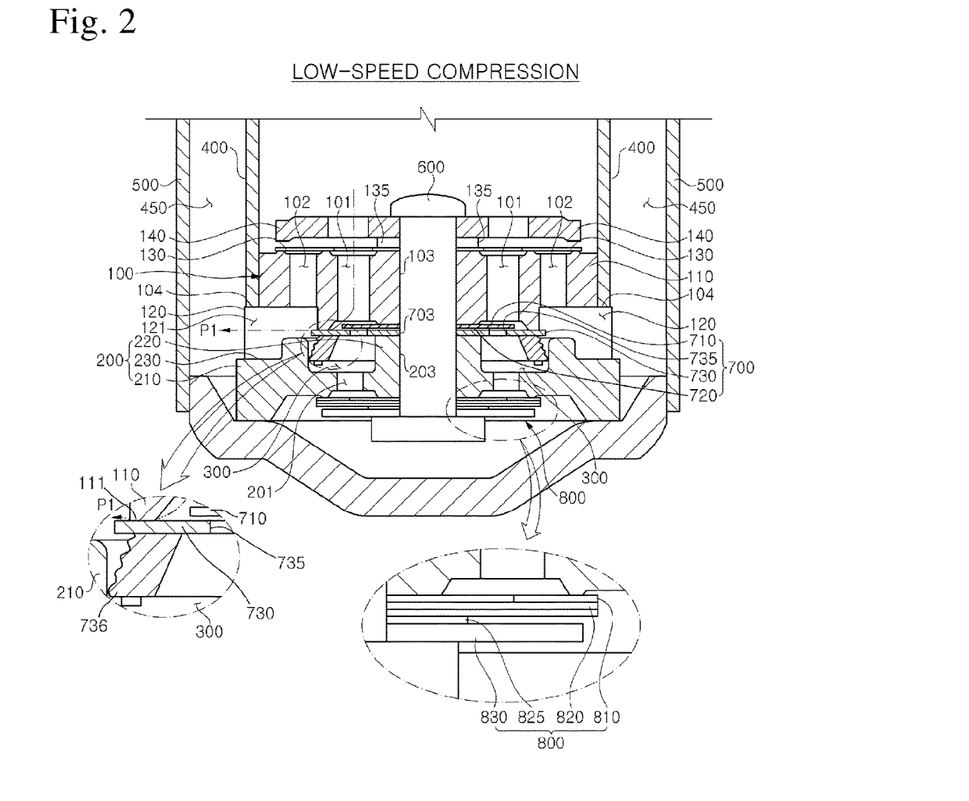
FIG. 2 is a cross-sectional view illustrating a low-speed compression stroke state of the body valve assembly for the shock absorber according to the present invention.

FIG. 1 is a cross-sectional view illustrating a high-speed compression stroke state of a body valve assembly for a shock absorber according to the present invention, and FIG. 2 is a cross-sectional view illustrating a low-speed compression stroke state of the body valve assembly for the shock absorber according to the present invention.

Figure 3:
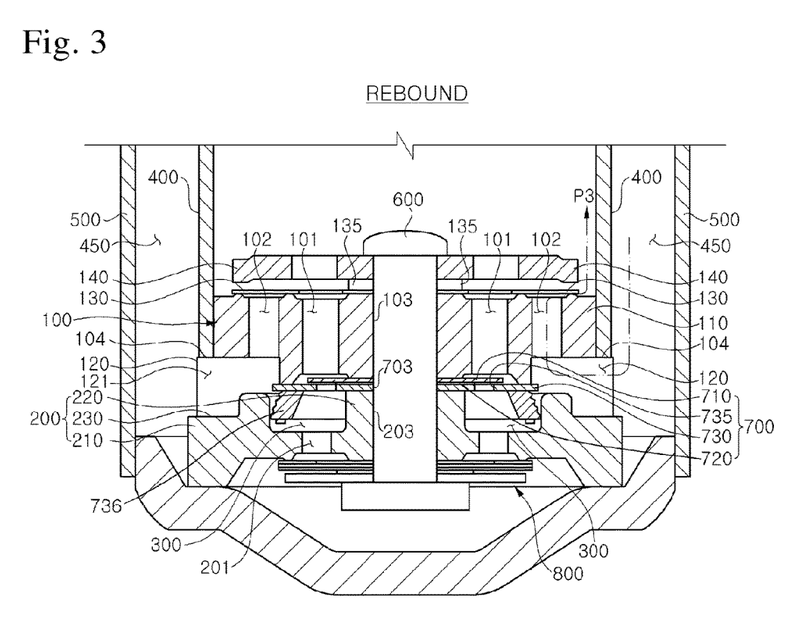
FIG. 3 is a cross-sectional view illustrating a rebound stroke state of the body valve assembly for the shock absorber according to the present invention.
Figure 4:
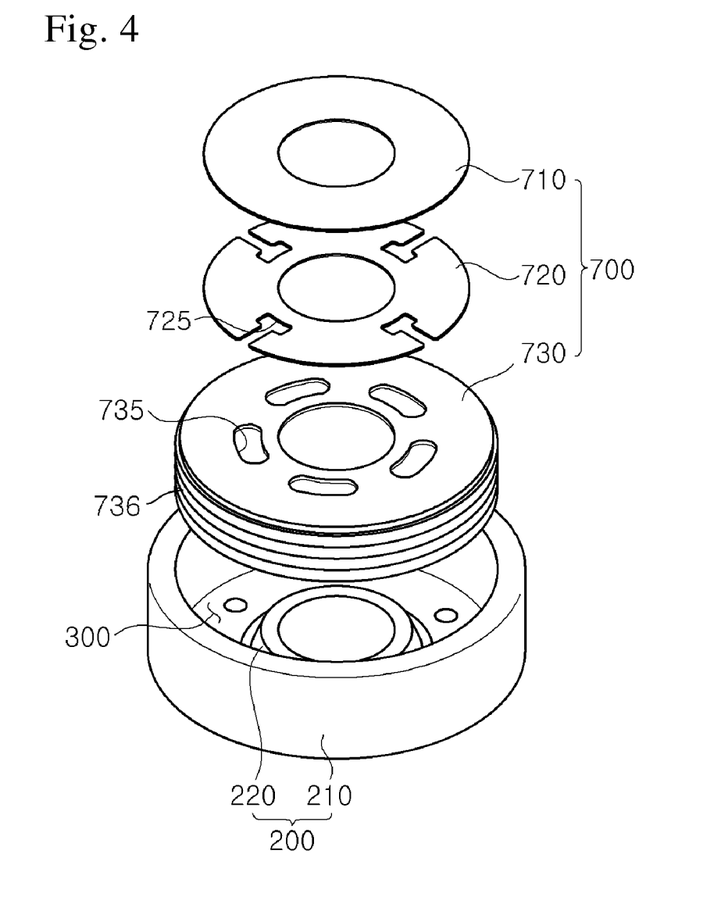
FIG. 4 is a perspective view illustrating a pilot valve and a retainer body in the body valve assembly for the shock absorber according to the present invention.

In addition, FIG. 3 is a cross-sectional view illustrating a rebound stroke state of the body valve assembly for the shock absorber according to the present invention, and FIG. 4 is a perspective view illustrating a pilot valve and a retainer body in the body valve assembly for the shock absorber according to the present invention.

Hereinafter, preferred embodiments of the present invention will be described with reference to the accompanying drawings.

Referring to FIGS. 1 to 4, the body valve assembly for the shock absorber according to the present invention includes a cylinder, a valve body 100, a body retainer 200, a pilot chamber 300, a pilot valve 700, and a main valve module 800.

The cylinder includes an inner cylinder 400, and an outer cylinder 500 installed outside the inner cylinder 400 and spaced apart from the inner cylinder 400 by a predetermined distance, such that a reservoir chamber 450 is formed between the inner cylinder 400 and the outer cylinder 500.

The valve body 100 is installed in a lower end of the inner cylinder 400. and has at least one compression passage 101 that allows a working fluid to flow from the inner cylinder 400 to the reservoir chamber 450 between the inner cylinder 400 and the outer cylinder 500 during a compression stroke of the shock absorber.

For example, during a high-speed compression stroke, a first damping passage P1 and a second damping passage P2 may be formed together as illustrated in FIG. 1. During a low-speed compression stroke, only the first damping passage P1 may be formed as illustrated in FIG. 2.

The valve body 100 has one or more rebound passage 102 that allows the working fluid to flow from the reservoir chamber 450 to the inner cylinder 400 during a rebound stroke of the shock absorber.

That is, as illustrated in FIG. 3, a third damping passage P3 is formed to allow the working fluid to flow from the reservoir chamber 450 to the inside of the inner cylinder 400.

To this end, the valve body 100 may be provided with a body 110 and a connection passage 120.

The body 110 is installed in a lower end of the inside of the inner cylinder 400. The compression passage 101 is formed in a central direction of the body 110, and the rebound passage 102 is formed in an edge direction of the body 110.

The compression passage 101 and the rebound passage 102 may be radially disposed to vertically penetrate the body 110, and the rebound passage 102 may be disposed in an outward direction of the compression passage 101.

The connection passage 120 is cut along a lower edge of the body 110 at a set interval, such that the pilot valve 700 and the pilot chamber 300 are disposed inside, thereby forming a laterally penetrating passage.

That is, the connection passage 120 communicates the lower end of the compression passage 101 with the reservoir chamber 450 when the pilot valve 700 is opened by the compression stroke.

In addition, the connection passage 120 communicates the reservoir chamber 450 with the lower end of the rebound passage 102 during the rebound stroke.

The body retainer 200 is disposed under the valve body 100 and has one or more compression communication passages 201 vertically penetrating so as to be connected to the compression passage 101.

The pilot chamber 300 is concavely formed on the body retainer 200 and vertically communicates with the compression communication passages 201 of the body retainer 200.

The pilot valve 700 is disposed between the valve body 100 and the body retainer 200. During the compression stroke, the pilot valve 700 is opened to allow the working fluid to flow to the reservoir chamber 450 and allow the working fluid moved through the compression passage 101 to flow to the pilot chamber 300.

To this end, the pilot valve 700 may be provided with a first pilot disk 710, a second pilot disk 720, and a third pilot disk 730.

The first pilot disk 710 is disposed on a bottom surface of the body 110. Specifically, a central portion of the first pilot disk 710 comes into contact with the bottom surface of the body 110.

At this time, an edge portion of the first pilot disk 710 has a sufficient diameter to open a portion of the compression passage 101.

The second pilot disk 720 is disposed on a bottom surface of the first pilot disk 710 and has one or more first communication holes 725 formed along an edge portion. The third pilot disk 730 is disposed on a bottom surface of the second pilot disk 720 and has a larger diameter than the second pilot disk 720. An upper edge portion of the third pilot disk 730 is installed to come into close contact with the lower end of the body 110.

In addition, a side surface of the third pilot disk 730 is installed to be movable while coming into close contact with an inner wall of the pilot chamber 300.

A second communication hole 735 vertically penetrates the third pilot disk 730 such that the first communication hole 725 communicates with the pilot chamber 300. A rubber 736, which has a hollow in a center, is further provided under the third pilot disk 730 such that the second communication hole 735 communicates with the pilot chamber 300.

The rubber 736 is installed to be movable while coming into close contact with the inner wall of the pilot chamber 300.

As such, the edge portion of the third pilot disk 730 opens a gap without shape deformation by the pressure of the working fluid moving downward through the compression passage 101 during the low-speed compression stroke. Thus, the compression passage 101 communicates with the reservoir chamber 450.

At this time, the opening degree of the third pilot disk 730 is slight, and a small amount of the working fluid moves to the reservoir chamber 450 along the opened portion of the third pilot disk. 730.

On the other hand, the edge portion of the third pilot disk 730 is bent downward and opened by the pressure of the working fluid moving downward through the compression passage 101 during the high-speed compression stroke.

At this time, the first damping passage P1 is formed to allow the working fluid tom the reservoir chamber 450 through the compression passage 101.

During this process, the second communication hole 735 of the third pilot disk 730 is opened in a wide area while being spaced apart from the first communication hole 725. Therefore, a large amount of the working fluid is moved to the pilot chamber 300 through the second communication hole 735.

Then, the pressure is formed in the pilot chamber 300 above a set pressure range. At this time, a main valve module to be described below is opened to communicate the compression communication passage 201 with the reservoir chamber 450.

That is, during the low-speed compression stroke, the working fluid is moved to only the reservoir chamber 450 through the opened portion of the third pilot disk 730 as illustrated in FIG. 2.

On the other hand, during the high-speed compression stroke, a large amount of the working fluid is moved to the pilot chamber 300 through the second communication hole 735 as illustrated in FIG. 1. Accordingly, the working fluid can also be moved to the reservoir chamber 450 through the compression communication passage 201 by the opening of the main valve module to be described below.

Therefore, since the main valve module 800 to be described below can be selectively opened during the high-speed compression stroke, it is possible to prevent an excessive increase in the internal pressure of the pilot chamber 300. As a result, it is possible to prevent an excessive increase in the damping force.

The body valve assembly for the shock absorber according to the present invention may further include a pin 600 which allows the valve body 100, the pilot valve 700, and the body retainer 200 to be sequentially stacked from the top for convenient fastening.

In addition, the body valve assembly for the shock absorber according to the present invention may further include fastening holes 103, 203, and 703 which are respectively formed in central portions of the valve body 100, the body retainer 200, and the pilot valve 700 to communicate with one another. The pin 600 penetrates the fastening holes 103, 203, and 703.

In addition, the body valve assembly for the shock absorber according to the present invention may further include a check valve disk 130 disposed on an upper side of the valve body 100, a washer 140 disposed on an upper side of the check valve disk 130, and a spacer 135 disposed between the check valve disk 130 and the washer 140.

In addition, in order for the confirmation of an accurate fastening location and the convenient assembly operation, the valve body 100 may further include an inner cylinder mount protrusion 104 which is stepped along an upper edge of the body 110 so as to fix the lower end of the inner cylinder 400.

The valve body 100 may further include a lower disk sheet 111 which is formed to have a ring shape on the bottom surface of the body 110 and protrudes along an outer edge of the compression passage 101.

The pilot valve 700 selectively opens and closes a passage of the pilot chamber 300 and the compression communication passage 201 while contacting the lower disk sheet 111 or being spaced apart from the lower disk sheet 111 along the flow of the working fluid.

On the other hand, the body retainer 200 may further include: a retainer body 210 disposed under the valve body 100; a valve support portion 220 which protrudes from the central portion of the retainer body 210 to support the central portion of the pilot valve 700; and a body mount protrusion 230 which is stepped on an upper edge of the retainer body 210 so as to mount and fix the body 110 of the valve body 100.

The pilot chamber 300 is recessed in a ring shape on the top surface of the retainer body 210 along an outer periphery of the valve support portion 220.

At this time, the compression communication passage 201 penetrates the bottom surface of the pilot chamber 300. The upper end of the valve support portion 220 protrudes higher than the top surface of the retainer body 210 so as not to affect the operation of the pilot valve 700.

When the pressure of the pilot chamber 300 increases to a set pressure range or more, the main valve module 800 is opened to generate a damping force and adjust the pressure of the pilot chamber 300.

To this end, the main valve module 800 may include a disk-S 810 mounted on the bottom surface of the body retainer 200, at least one main disk 820 stacked on a bottom surface of the disk-S 810, a main spacer 825 disposed on a bottom surface of the at least one main disk 820, and a main washer 830 disposed on a bottom surface of the main spacer 825.

The operating process of the body valve assembly for the shock absorber according to the present invention will be described below with reference to FIGS. 1 to 4.

First, during the low-speed compression stroke as illustrated in FIG. 2, the working fluid inside the inner cylinder 400 passes through the compression passage 101 of the valve body 100 and opens the third pilot disk 730 to form the first damping passage P1 through which the working fluid moves to the connection passage 120 and the reservoir chamber 450.

Therefore, the working fluid passing through the compression passage 101 of the body 110 generates the damping force while moving to the reservoir chamber 450 through the third pilot disk 730, and the pilot chamber 300 is filled with a portion of the working fluid passing through the second communication hole 735.

On the other hand, during the high-speed compression stroke as illustrated in FIG. 1, the working fluid inside the inner cylinder 400 passes through the compression passage 101 of the valve body 100, opens the third pilot disk 730, and moves to the connection passage 120 and the reservoir chamber 450.

At the same time, during the high-speed compression stroke, since the second communication hole 735 is opened in a wide width, the pilot chamber 300 is filled with a large amount of the working fluid through the second communication hole 735.

At this time, since the main valve module 800 is opened while the internal pressure of the pilot chamber 300 increases above the set pressure range, the second damping passage P2 is formed while the pilot chamber 300 communicates with the reservoir chamber 450 through the opened compression communication passage 201.

According to the present invention, two damping paths through which the working fluid is discharged according to the flow rate and pressure of the supplied working fluid are formed, thereby improving the degree of freedom of the adjustment in damping force, preventing the damping force from being rapidly changed, and improving ride comfort.

The basic technical idea of the present invention is to provide the body valve assembly for the shock absorber, which is capable of improving the ride comfort by improving the degree of freedom of the adjustment in damping force and preventing the damping force from being rapidly changed.

While the embodiments of the present invention have been described with reference to the specific embodiments, it will be apparent to those skilled in the art that various changes and modifications may be made without departing from the spirit and scope of the invention as defined in the following claims.

DESCRIPTION OF REFERENCE NUMERALS

| | |
|---|---|
| 100: valve body | 101: compression passage |
| 102: rebound passage | 103, 203, and 703: fastening hole |
| 104: inner cylinder mount protrusion | 110: body |
| 111: lower disk sheet | 120: connection passage |
| 130: check valve disk | 135: spacer |
| 140: washer | 200: body retainer |
| 201: compression communication passage | 210: retainer body |
| 220: valve support portion | 230: body mount protrusion |
| 300: pilot chamber | 400: inner cylinder |
| 450: reservoir chamber | 500: outer cylinder |
| 600: pin | 700: pilot valve |
| 710: first pilot disk | 720: second pilot disk |
| 725: first communication hole | 730: third pilot disk |
| 735: second communication hole | 800: main valve module |
| 810: disk-S | 820: main disk |
| 825: main spacer | 830: main washer |
| P1: first damping path | P2: second damping path |
| P3: third damping path | |

What is claimed is:

1. A body valve assembly for a shock absorber, comprising:
a cylinder divided into an inner cylinder and an outer cylinder such that a reservoir chamber is formed therebetween;
a valve body which is installed in a lower end of the inner cylinder and includes at least one compression passage allowing a working fluid to flow from the inner cylinder to the reservoir chamber during a compression stroke and at least one rebound passage allowing the working fluid to flow from the reservoir chamber to the inner cylinder during a rebound stroke;
a body retainer which is disposed under the valve body and spaced apart from the valve body and includes at least one compression communication passage so as to be connected to the compression passage;
a pilot chamber which is formed to have a recessed space on a top surface of the body retainer and communicates with a lower end of the compression passage and an upper end of the compression communication passage;
a pilot valve which is disposed between the valve body and the body retainer, the pilot valve being simultaneously opened to communicate the lower end of the compression passage with the reservoir chamber when the working fluid moves to the pilot chamber during a low-speed compression stroke; and
a main valve module which is closed in a state of coming into close contact with a bottom surface of the body retainer during the low-speed compression stroke, and is opened when a pressure of the pilot chamber is above a set pressure range during a high-speed compression stroke, so that the compression communication passage communicates with the reservoir chamber,
wherein the valve body includes:
a body which is installed in an inner lower end of the inner cylinder and has the compression passage formed circumferentially in a ring shape and the rebound passage formed circumferentially in a ring shape around the compression passaged and spaced apart from the compression passage; and a connection passage which is cut along a lower edge of the body in a horizontal direction at a lower end of the rebound passage to allow communication between the lower end of the compression passage and the reservoir chamber, which is formed between the inner cylinder and the outer cylinder, via the rebound passage when the pilot valve is opened, and wherein an inner periphery of the connection passage communicates the lower end of the compression passage with the reservoir chamber by the opening of the pilot valve during a compression stroke, and communicates the reservoir chamber with a lower end of the rebound stroke during a rebound stroke.

2. The body valve assembly according to claim 1, wherein the valve body includes:

an inner cylinder mount protrusion which is stepped along an upper edge of the body so as to fix the lower end of the inner cylinder; and a lower disk sheet that is formed to have a ring shape on a bottom surface of the body and protrudes along an outer periphery of the compression passage.

3. The body valve assembly according to claim 1, wherein the pilot valve includes:

a first pilot disk which is disposed on a bottom surface of the body in a state in which a central portion of the first pilot disk comes into contact with the bottom surface of the body;

a second pilot disk which is disposed on a bottom surface of the first pilot disk and has a first communication holes vertically penetrating along an edge portion; and a third pilot disk which is disposed on a bottom surface of the second pilot disk and has a larger diameter than the second pilot disk, a top surface of the third pilot disk coming into close contact with the lower end of the body, a side surface of the third pilot disk being installed to be movable while coming into close contact with an inner wall of the pilot chamber, a second communication hole being formed to vertically penetrate the third pilot disk such that the first communication hole communicates with the pilot chamber.

4. The body valve assembly according to claim 3, further comprising a rubber which is disposed under the third pilot disk, wherein the rubber has a hollow in a center such that the second communication hole communicates with the pilot chamber, and the rubber is installed to be movable while coming into close contact with the inner wall of the pilot chamber.

5. The body valve assembly according to claim 1, wherein the body retainer includes:

a retainer body which is disposed under the valve body;

a valve support portion which protrudes from a central portion of the retainer body and supports the central portion of the pilot valve; and a body mount protrusion which is stepped along an upper edge of the retainer body so as to mount and fix the valve body, the pilot chamber is recessed in a ring shape on a top surface of the retainer body along an outer periphery of the valve support portion, and the compression communication passage penetrates a bottom surface of the pilot chamber.

6. The body valve assembly according to claim 5, wherein an upper end of the valve support portion protrudes higher than the top surface of the retainer body.

7. The body valve assembly according to claim 1, wherein the main valve module includes:

a supplemental disk which is mounted on the bottom surface of the body retainer;

at least one main disk which is stacked on a bottom surface of the supplemental disk;

a main spacer which is disposed on a bottom surface of the main disk; and a main washer which is disposed on a bottom surface of the main spacer.

8. The body valve assembly according to claim 1, wherein the valve body, the pilot valve, and the body retainer are sequentially stacked by a pin that vertically penetrates centers thereof.

* * * * *